United States Patent [19]

Kotlicki et al.

[11] Patent Number: 4,604,524

[45] Date of Patent: Aug. 5, 1986

[54] PASSIVE INFRA-RED SENSOR

[76] Inventors: Yaacov Kotlicki, 20 Yoav Street, Ramat Gan; Moshe Kotlicki, 24 Weisburg Street, Tel Aviv, both of Israel

[21] Appl. No.: 659,945

[22] Filed: Oct. 11, 1984

[51] Int. Cl.[4] .................................... G01J 5/04

[52] U.S. Cl. .................................... 250/342; 250/347; 250/353

[58] Field of Search ............... 250/342, 347, 353, 239; 340/567, 600, 693

[56] References Cited

U.S. PATENT DOCUMENTS 4,258,255 3/1981 Guscott ............................... 250/221
4,447,726 5/1984 Mudge et al. ......................... 250/342
4,484,075 11/1984 Kahl, Jr. et al. .................... 250/342

FOREIGN PATENT DOCUMENTS 2836462 3/1980 Fed. Rep. of Germany ...... 340/600

*Primary Examiner*—Bruce C. Anderson
*Assistant Examiner*—Constantine Hannaher
*Attorney, Agent, or Firm*—Browdy and Neimark

[57] ABSTRACT

A passive infra-red sensor comprising a housing including a mounting base and a lens mounting cover element, detector support apparatus selectably positionable with respect to said mounting base along a first axis, an infra-red detector and a beam locator illuminator mounted on the detector support apparatus, a multi-faceted focusing lens including a first array of beam defining lenses arranged for optical coupling to the infra-red detector and a second array of beam defining lenses arranged for optical coupling to the beam locator illuminator.

17 Claims, 12 Drawing Figures

PASSIVE INFRA-RED SENSOR

FIELD OF THE INVENTION

The present invention relates to passive infra-red sensors generally and more particularly to passive infrared detectors suitable for intrusion detection applications.

BACKGROUND OF THE INVENTION

Various types of passive infra-red sensors are presently being marketed for intrusion detection applications. The Sontrix Passive Infrared Intrusion Detector, manufactured by Ademco of Syosset, N.Y., defines a plurality of protective zones, each of which is defined by its own parabolic reflecting surface. Horizontal and vertical adjustability is provided by suitable positioning of the entire optical head.

Series S8600 Motion Detectors of Arrowhead Enterprises Inc. provides a beam locator whereby an LED illuminates the protective zones, enabling an installer to determine the zones of protection. Since the LED is displaced from the detector, apparatus for focusing the LED beam is required in addition to that used in association with the detector. In the Arrowhead apparatus, beam locator focussing lenses are provided within each of the detector focussing lenses.

The Red-Watch PIR 550 passive infrared sensor manufactured by Napco Security Systems, Inc. of Capiague, N.Y. provides interchangeable lenses but does not provide a built in beam locator.

SUMMARY OF THE INVENTION

The present invention seeks to provide an improved passive infra-red sensor which is easier to install and less expensive to construct than prior art devices, while providing features not found therein.

There is thus provided in accordance with a preferred embodiment of the present invention, a passive infra-red sensor comprising a housing including a mounting base and a lens mounting cover element, detector support apparatus selectably positionable with respect to said mounting base along a first axis, an infrared detector and a beam locator illuminator mounted on the detector support apparatus, a multi-faceted focusing lens including a first array of beam defining lenses arranged for optical coupling to the infrared detector and a second array of beam defining lenses arranged for optical coupling to the beam locator illuminator.

Further in accordance with a preferred embodiment of the present invention, the multi-faceted focusing lens is one of a plurality of interchangeable lenses having differing configurations corresponding to differing protection zone configurations.

Additionally in accordance with a preferred embodiment of the present invention the multi-faceted focusing lens is configured to define protection zones extending in directions both above and below the horizontal plane.

Further in accordance with a preferred embodiment of the present invention, the lens mounting cover element is arranged to permit adjustment of the orientation of the lens with respect to the cover element in azimuth. According to a preferred embodiment of the invention, the azimuth adjustment is in a plane perpendicular to the first axis of adjustability of the detector support relative to the mounting base.

Additionally in accordance with a preferred embodiment of the present invention, the lens provides an azimuthal coverage of up to approximately 140 degrees.

Further in accordance with a preferred embodiment of the present invention, there is provided lens mounting and locking apparatus including first and second lens retaining members arranged fór snap fit engagement with the cover element, whereby once inserted, they can be removed only from the inside of the cover element and not from the outside thereof.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
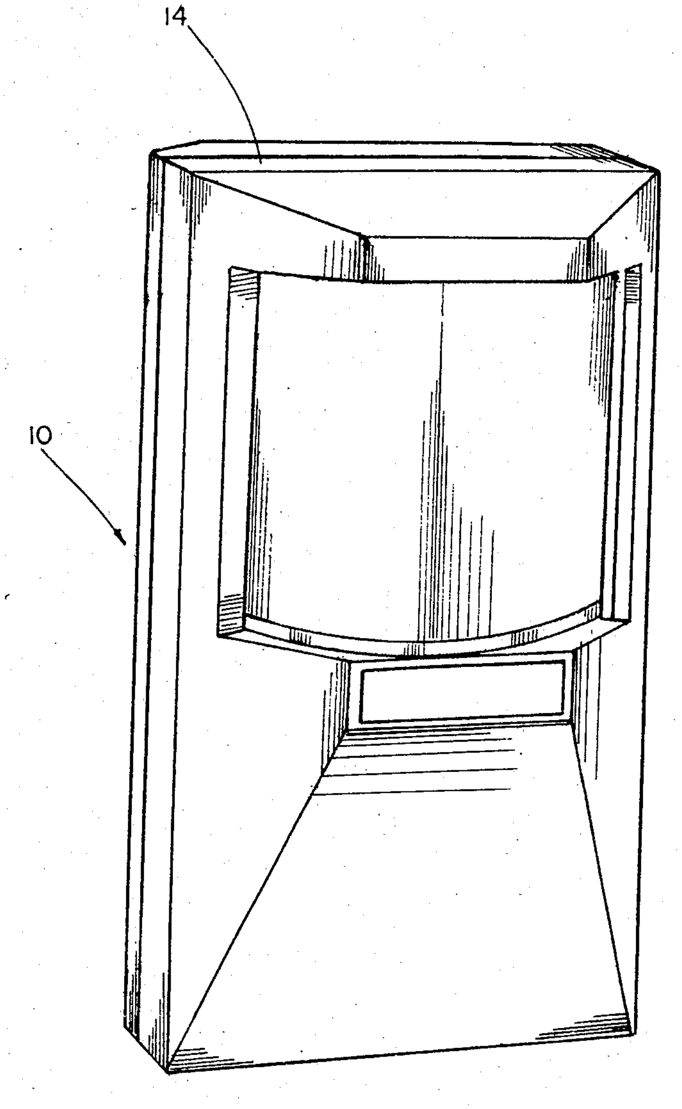
FIG. 1 is a pictorial illustration of a passive infrared sensor constructed and operative in accordance with a preferred embodiment of the present invention.
Figure 2A:
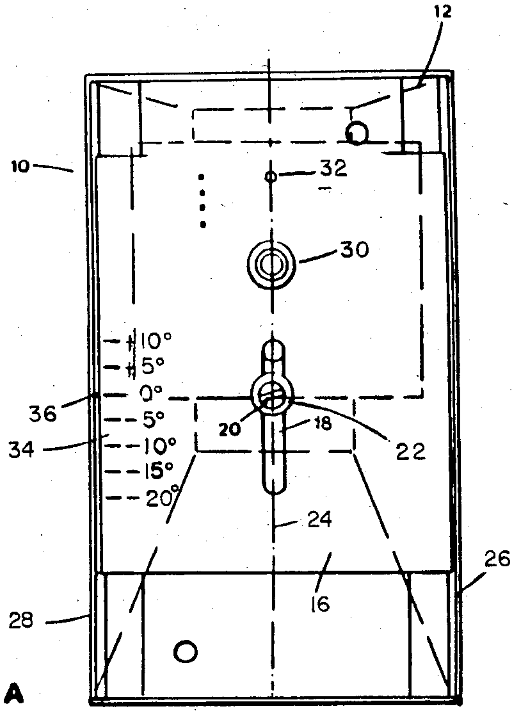
FIGS. 2A and 2B are plane and side view illustrations of the interior of the sensor of FIG. 1, illustrating the selectable positionability of the detector support element forming part thereof.
Figure 2B:
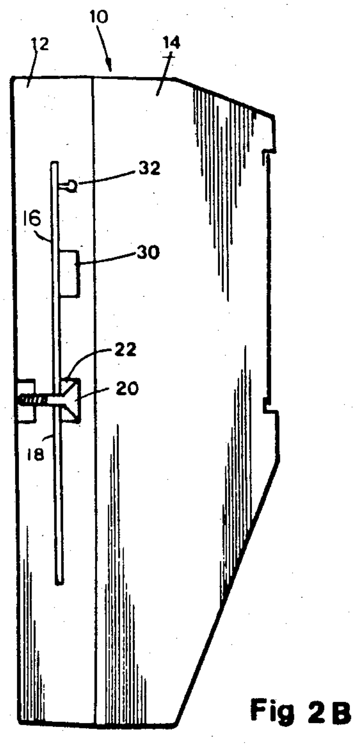

Referring now to FIGS. 1, 2A and 2B there is seen a passive infra-red detector constructed and operative in accordance with a preferred embodiment of the present invention and comprising a housing 10 of generally two part construction including a back mounting base portion 12 and a forward lens mounting cover portion 14. These two portions are arranged for removable snap fit engagement.

Arranged for slidably selectable mounting in a predetermined plane defined by the back mounting base portion 12 is a detector support board 16. According to a preferred embodiment of the invention detector support board 16 is formed with an elongate slit 18 and is mounted onto the back mounting base portion 12 by means of a mounting screw 20 which extends through slit 18 and engages the detector support board 16 via a retaining washer 22.

Slit 18 is configured to lie along an axis 24 which lies parallel to the axes of parallel support ridges 26 and 28 which are molded into the back mounting portion 12 and which define a track along which board 16 may be moved intermediate mounting positions. The detector support board 16 may thus be selectably positioned with respect to the housing in the plane defined by ridges 26 and 28 and along the axis 24. Once a desired position is selected, tightening of the mounting screw 20 fixes the board in a predetermined position along axis 24 until the screw is again loosened.

Mounted on the detector support board 16 are an infra-red sensor 30, such as a RPY-93 pyroelectric detector, manufactured by Mullard of England, and, spatially separated therefrom along an axis identical to axis 24, an LED or other suitable illuminating device 32 for providing illumination for a beam locator.

It is a particular feature of the present invention that a scale 34 is defined on board 16 which cooperates with a pointer 36 defined on a side of the back mounting portion 12. The scale, which is graduated in degrees, provides an indication of correspondence between positioning of board 16 relative to the housing and the angular orientation of the detection and location beams relative to a reference horizontal plane defined perpendicular to axis 24.

Figure 7:
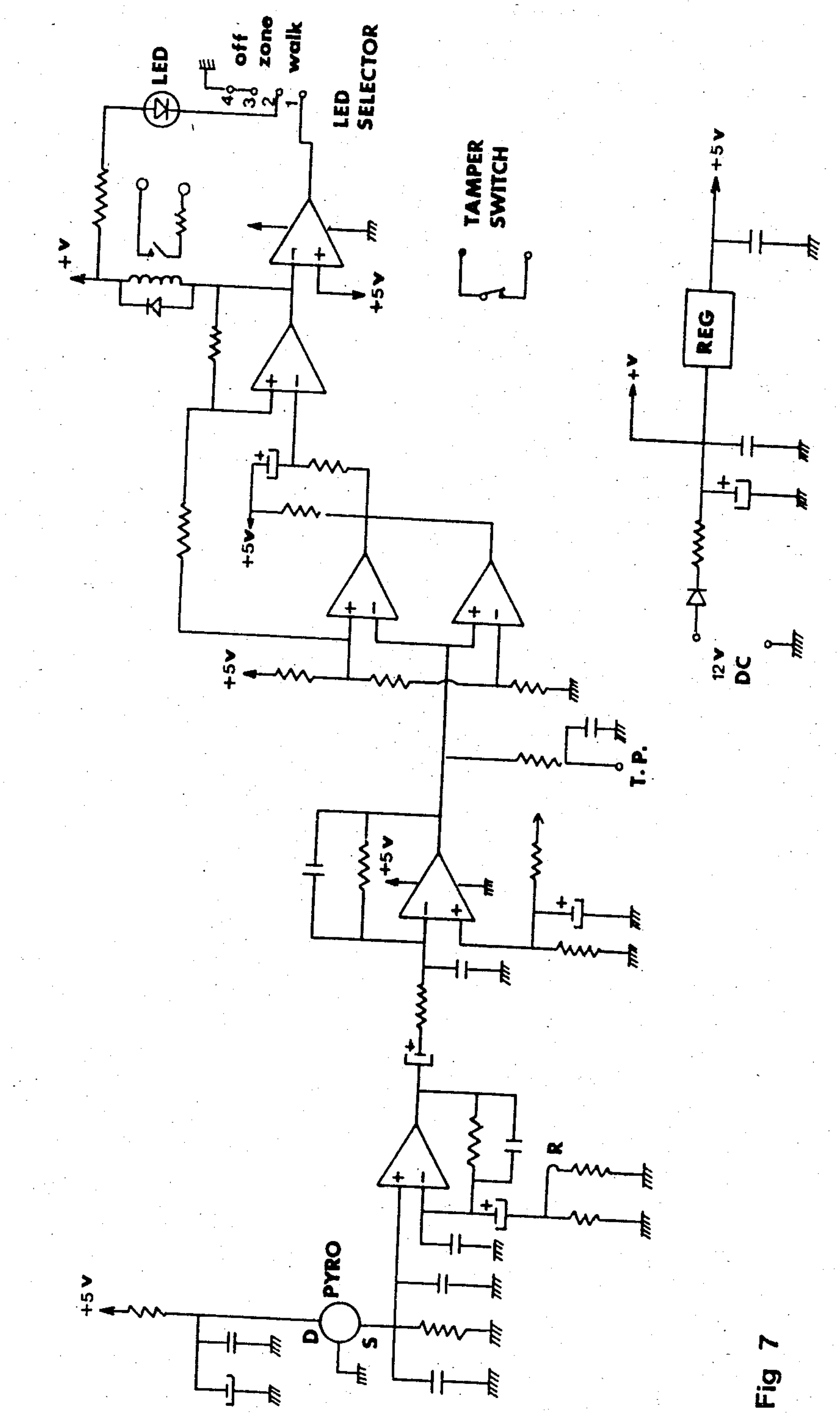
FIG. 7 is a schematic illustration of the electronic circuitry employed in a preferred embodiment of the sensor.

The remainder of the circuitry mounted on board 16 is described in the schematic illustration of FIG. 7 and is conventional in the art.

Figure 3A:
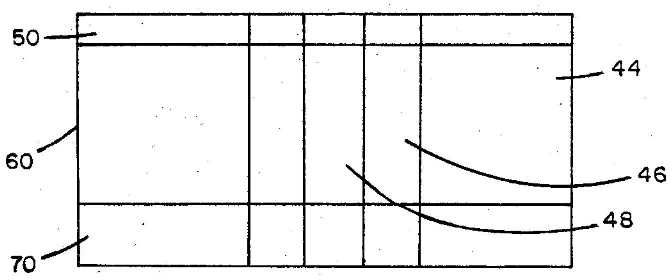
FIGS. 3A and 3B are illustrations of exemplary lenses useful in the apparatus of FIG. 1.
Figure 3B:
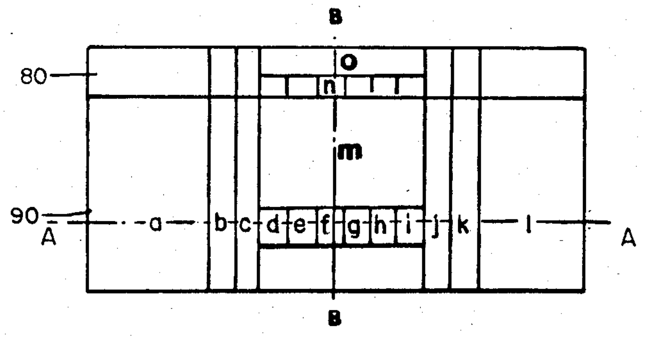

Turning now to FIGS. 3A and 3B, , there are illustrated two examples from among a library of a multiplicity of lenses 40. These lenses are typically flexible lenses formed by embossing plastic sheets with a desired lens array pattern. It is a particular feature of lenses 40 that they define two corresponding lens arrays, one for use with the infra red detector 30 and the other for use with the LED 32 for providing a beam locator. The respective optical axes of these two arrays are offset from each other by a distance which is preferably identical to the separation between the infra red detector 30 and the LED 32 on the circuit board 16.

The lenses of FIGS. 3A and 3B are also characterized in that they define individual lenses 44, 46 and 48, for example, which each define detection zones which are separated from each other in azimuth. A wide maximum azimuth of up to 140 degrees is provided.

Selected ones of lenses 40 also provide multiple layers of detection zones in elevation. Referring, for example, to FIG. 3A, there are seen three parallel lens arrays 50, 60 and 70, which may correspond to upwardly directed, horizontally directed and downwardly directed detection zones, respectively. It is a particular feature of the present invention that lens array 50 is also used as part of the beam locator, when LED 32 is illuminated in a beam location mode of operation.

Figure 6A:
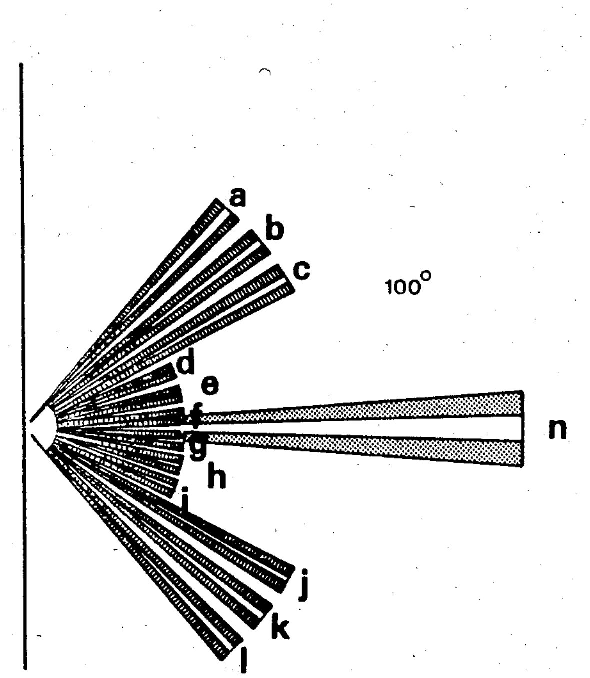
FIGS. 6A and 6B are respective azimuthal and vertical beam diagrams illustrating the protection zones produced by a lens of the type illustrated in FIG. 3B.
Figure 6B:
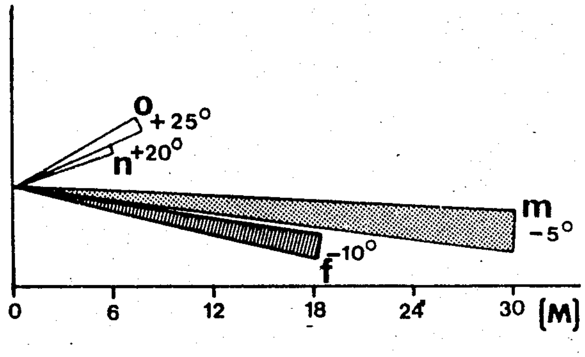

Referring now to FIG. 3B, there is seen a lens defining two lens array regions 80 and 90. Region 80 is used for the beam locator and also to generate an upwardly directed beam distribution, while region 90 is used to provide a plurality of differently directed azimuthal beam distributions. It is noted that the regions 80 and 90 of the lens of FIG. 3B provide identical azimuthal beam distributions having an angular offset therebetween. For example, FIG. 6A illustrates the azimuthal beam distribution for the area of the region 90 taken along a line A—A, shown in FIG. 3B. FIG. 6B illustrates the vertical beam distribution corresponding to the lenses arranged along a line B—B. For clarity, each beam is labelled with a reference letter corresponding to the lens area from which it originates.

Reference is now made to FIGS. 4A–4C and 5, which illustrate the mounting of lens 40 in the forward lens mounting cover portion 14. It is seen that forward lens mounting cover portion 14 defines a window region 80 including an opening 82, which is bordered by top and bottom lens seating rims 88 and 90 and side seating rims 92 and 94.

Adjacent side seating rims 92 and 94 there are provided elongate slots 96 and 98 respectively which are designed to accomodate the edges of lens 40 as well as the snap fit retaining elements 100 and 102 (FIG. 4B) which selectably retain lens 40 in position. It is a particular feature of the present invention that the lens 40 has a width sufficiently greater than the width of window 82 so as to enable it to be selectably oriented with respect to the window, simply by inserting more or less of the edge of the lens into one slot or another. In this way, desired azimuthal orientation of of the detection zones is achieved. It is a further feature of the present invention that vertical and azimuthal orientation of the detection zones are effected by separate and independent mechanisms, thereby making installation and orientation of the detection zones much easier.

Figure 4A:
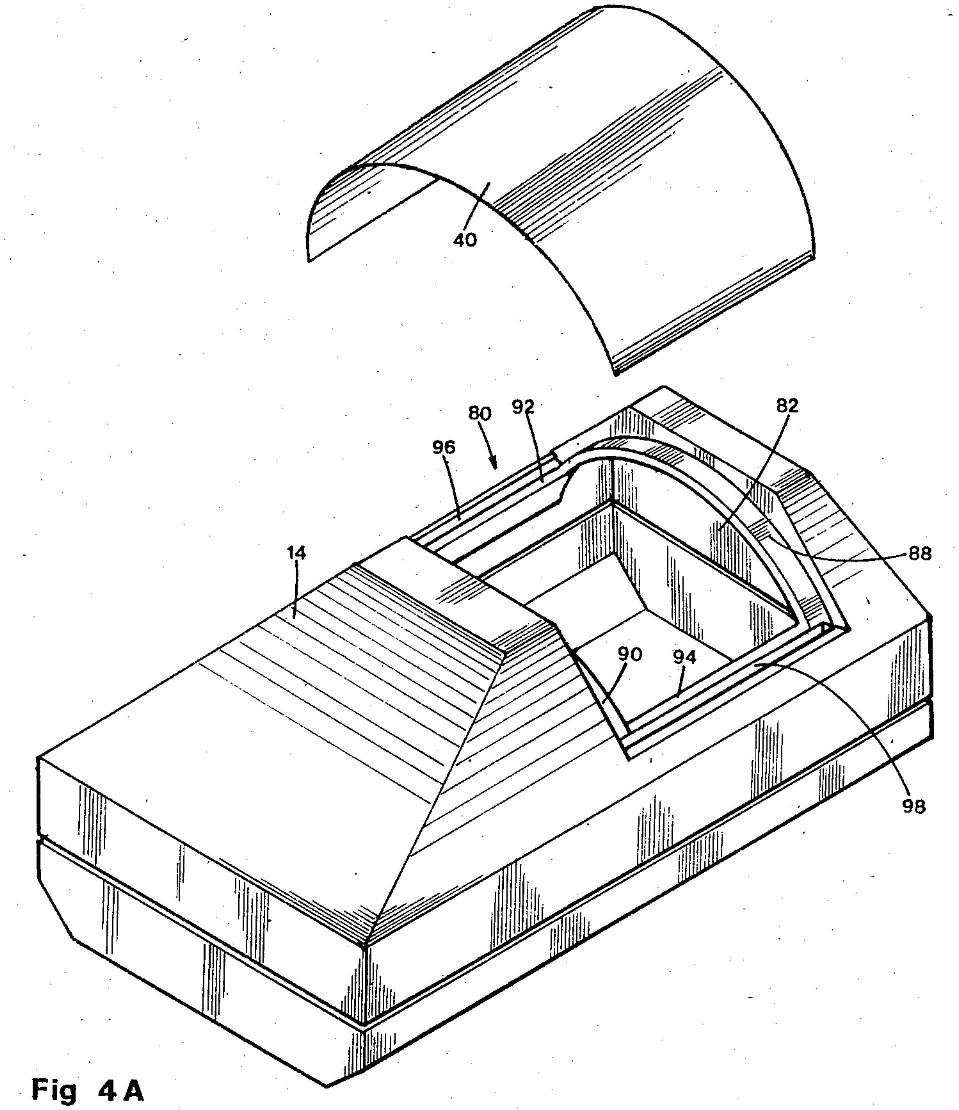
FIGS. 4A, 4B and 4C are three pictorial illustrations illustrating mounting of the lens in the cover element.
Figure 4B:
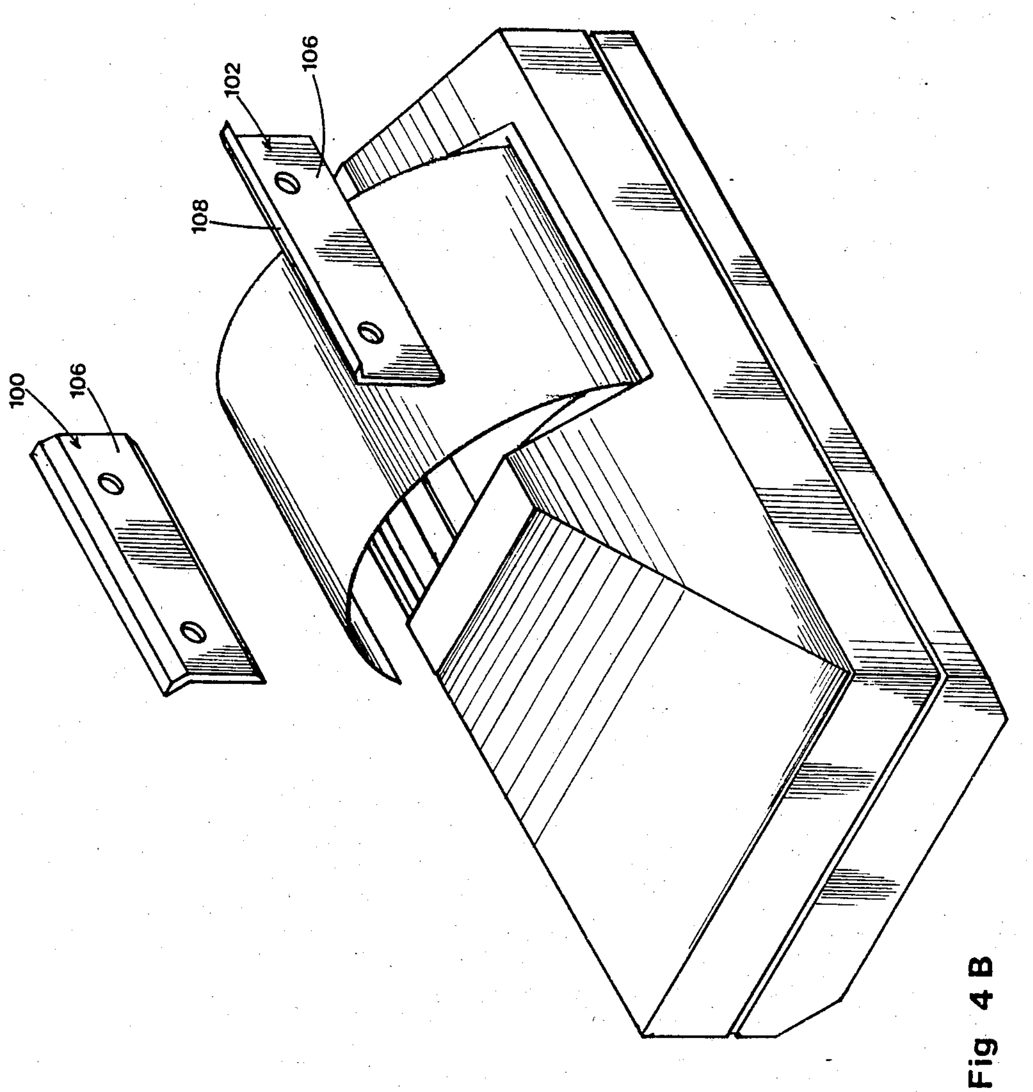
Figure 5:
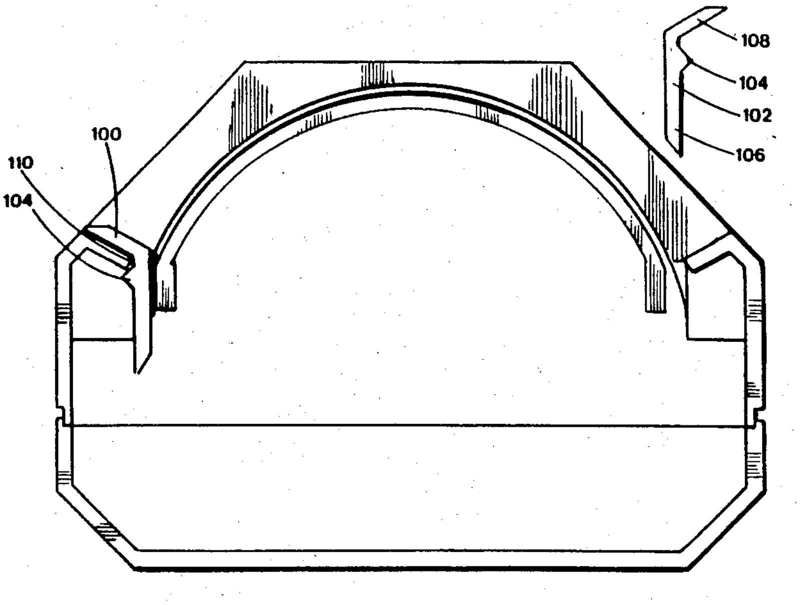
FIG. 5 is a sectional illustration of the apparatus of the invention, illustrating the lens mounting.
Figure 4C:
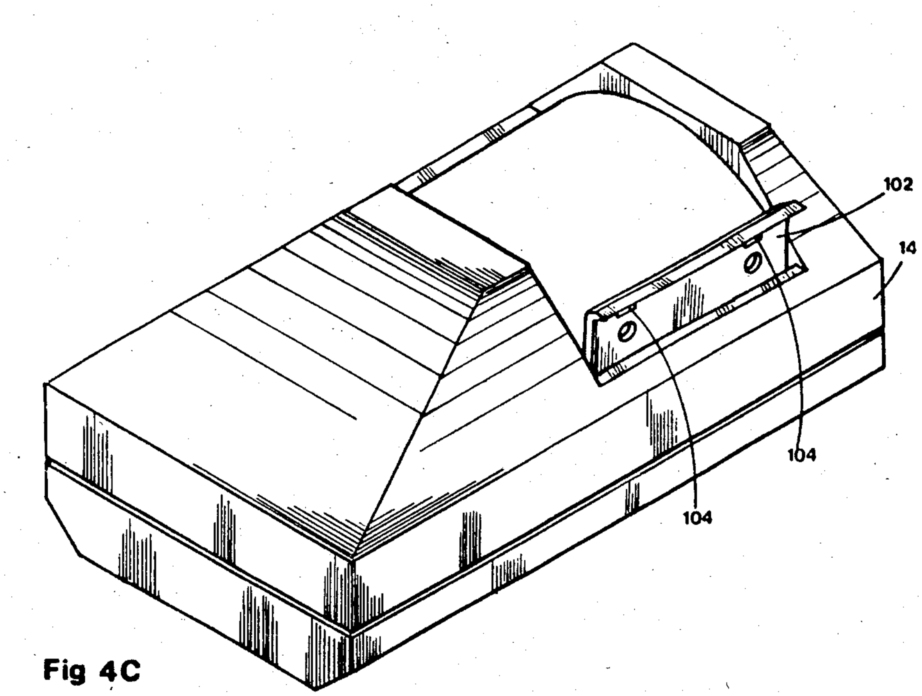

Considering now FIGS. 4B, 4C and 5 in particular, it is seen that snap fit retaining elements 100 and 102 each define a generally elongate element of generally uniform cross section, except for a pair of protrusions 104 which extend outwardly therefrom. In the particular embodiment illustrated herein, the elements 100 each comprise a planar portion 106 which is arranged to extend into the slot 96 or 98 and an inclined edge portion 108 which is intended to overlie the corresponding side seating rim 92 or 94, thus preventing prying in the corresponding slots. As seen with particularity in FIG. 5, protusions 104 extend in the same direction as inclined edge portions 108 and are arranged to engage the underside edge 110 of an outer side peripheral portion of cover portion 14, which borders on the corresponding slot. This engagement prevents removal of the retaining element from the exterior of the housing.

So long as both retaining elements 102 and 104 are fully seated in snap engagement with the cover portion 14, the lens 40 is retained in position over window 82 by frictional engagement. Removal of the lens 40 without damaging the housing, is only possible by first opening the housing and then forcing the planar portions 106 together, as by action of the fingers, so as to produce sufficient disengagement between protrusions 104 and the corresponding edges 110 to permit the elements 102 to be removed from the cover portion 14.

Since opening of the housing, which is necessary for the foregoing operation, is controlled by a tamper alarm, this can only be done by authorized persons.

Circuitry employed in the invention to provide an sensible alarm in response to intruder movement within the detection region of the apparatus of the present invention is illustrated in schematic form in FIG. 7. This is a preferred embodiment of the circuitry, it being understood that any other suitable circuitry may be alternatively employed.

It is a particular feature of the invention that independent vertical adjustment of the beam configurations in both upward and downward directions is provided by the axially selectable mounting of board 16 with respect to the mounting base. Scale 34 indicates that adjustments of up to approximately 10 degress upward and 20 degrees downward can be realized. This enables the detector to be mounted within a wide vertical range, and thus out of ordinary reach of a potential intruder.

It will be appreciated by persons skilled in the art that the present invention is not limited to the particular embodiment which has been described hereinabove for purposes of explanation and illustration. Rather the scope of the present invention is defined only by the claims which follow.

We claim:

1. A passive infra-red sensor comprising:

a housing including a mounting base and a lens mounting cover element;

detector support means;

an infrared detector mounted on the detector support means; and a lens arranged for optical coupling to the infrared detector; and lens mounting and locking retaining means arranged for snap fit engagement with said cover element, and which once inserted, can be removed only from the inside of the cover element and not from the outside thereof.

2. A passive infra-red detector according to claim 1 and wherein said lens is one of a plurality of interchangeable lenses having differing configurations corresponding to differing protection zone configurations.

3. A passive infra-red detector according to claim 1 and wherein said lens is configured to define protection zones extending in directions both above and below the horizontal plane.

4. A passive infra-red detector according to claim 1 and wherein said the lens mounting cover element is arranged to permit adjustment of the orientation of the lens with respect to the cover element in azimuth.

5. A passive infra-red detector according to claim 4 and wherein said azimuth adjustment is in a plane perpendicular to the first axis of adjustability of the detector support relative to the mounting base.

6. A passive infra-red detector according to claim 1 and wherein said lens provides an azimuthal coverage of up to approximately 140 degrees.

7. A passive infra-red sensor comprising:

a housing including a mounting base and a lens mounting cover element;

detector support means, selectably positionable with respect to said mounting base along a first axis;

an infrared detector mounted on the detector support means;

a multi-faceted focusing lens; and lens mounting and locking means including first and second lens retaining members arranged for snap fit engagement with said cover element, whereby once inserted, they can be removed only from the inside of the cover element and not from the outside thereof.

8. A passive infra-red detector according to claim 7 and wherein said multi-faceted lens is one of a plurality of interchangeable lenses having differing configurations corresponding to differing protection zone configurations.

9. A passive infra-red detector according to claim 7 and wherein said multi-faceted lens is configured to define protection zones extending in directions both above and below the horizontal plane.

10. A passive infra-red detector according to claim 7 and wherein said the lens mounting cover element is arranged to permit adjustment of the orientation of the lens with respect to the cover element in azimuth.

11. A passive infrared detector according to claim 10 and wherein said azimuth adjustment is in a plane perpendicular to the first axis of adjustability of the detector support relative to the mounting base.

12. A passive infra-red detector according to claim 7 and wherein said multi-faceted focusing lens provides an azimuthal coverage of up to approximately 140 degrees.

13. A passive infra-red sensor comprising:

a housing including a mounting base and a lens mounting cover element;

detector support means, selectably positionable with respect to said mounting base along a first axis;

an infrared detector mounted on said detector support means;

a multi-faceted lens configured to define protection zones extending in directions both above and below the horizontal plane; and lens mounting and locking means including first and second lens retaining members arranged for snap fit engagement with said cover element, whereby once inserted, they can be removed only from the inside of the cover element and not from the outside thereof.

14. A passive infra-red detector according to claim 13 and wherein said multi-faceted lens is one of a plurality of interchangeable lenses having differing configurations corresponding to differing protection zone configurations.

15. A passive infra-red detector according to claim 13 and wherein said the lens mounting cover element is arranged to permit adjustment of the orientation of the lens with respect to the cover element in azimuth.

16. A passive infra-red detector according to claim 13 and wherein said azimuth adjustment is in a plane perpendicular to the first axis of adjustability of the detector support relative to the mounting base.

17. A passive infra-red detector according to claim 13 and wherein said multi-faceted lens provides an azimuthal coverage of up to approximately 140 degrees.

* * * * *